(12) United States Patent
Leininger et al.

(10) Patent No.: US 7,729,128 B2
(45) Date of Patent: Jun. 1, 2010

(54) ELECTRICALLY ADAPTIVE MECHANICAL CONNECTION FOR ELECTRONIC DEVICES

(75) Inventors: Kristen M. Leininger, Lake Villa, IL (US); Ganiyu A. Hanidu, Algonquin, IL (US); James P. Phillips, Lake In The Hills, IL (US)

(73) Assignee: Motorola, Inc., Schaumburg, IL (US)

( * ) Notice: Subject to any disclaimer, the term of this patent is extended or adjusted under 35 U.S.C. 154(b) by 1095 days.

(21) Appl. No.: 11/239,265

(22) Filed: Sep. 29, 2005

(65) Prior Publication Data

US 2007/0072640 A1 Mar. 29, 2007

(51) Int. Cl.
*H04B 1/03* (2006.01)

(52) U.S. Cl. ............... 361/814; 361/816; 361/818

(58) Field of Classification Search ......... 361/814, 361/755, 715, 816, 818, 800; 174/51, 35 R; 455/575

See application file for complete search history.

(56) References Cited

U.S. PATENT DOCUMENTS

| | | | |
|---|---|---|---|
| 5,014,346 A | | 5/1991 | Phillips et al. |
| 5,497,339 A | | 3/1996 | Bernard |
| 6,600,450 B1 | | 7/2003 | Efanov et al. |
| 6,657,595 B1 * | 12/2003 | Phillips et al. ............. 343/702 |
| 6,781,551 B2 | | 8/2004 | Gerber |
| 6,806,835 B2 | | 10/2004 | Iwai et al. |
| 6,839,577 B2 | | 1/2005 | Krenz et al. |
| 6,959,210 B2 * | 10/2005 | Nakamura ............... 455/575.3 |
| 7,184,808 B2 * | 2/2007 | Shoji ..................... 455/575.7 |
| 7,336,782 B2 * | 2/2008 | Watanabe et al. ...... 379/433.13 |
| 7,515,012 B2 * | 4/2009 | Schulman et al. ......... 333/17.1 |
| 2001/0051510 A1 | 12/2001 | Nakamura |
| 2004/0222926 A1 | 11/2004 | Kontogeorgakis et al. |

FOREIGN PATENT DOCUMENTS

| | | |
|---|---|---|
| EP | 0622864 A1 | 11/1994 |
| GB | 2311903 A | 10/1997 |

* cited by examiner

*Primary Examiner*—Hung S Bui
(74) *Attorney, Agent, or Firm*—Hisashi D. Watanabe

(57) ABSTRACT

An electronic device, like a mobile telephone, has a first section and a second section. The first section and second section are coupled together by a mechanical connection, for example a hinge, swivel or sliding connector. Electronic components in the first section are coupled to electronic components in the second section by conductors capable of transferring power between the first and second sections. A current detector is capable of detecting currents, like surface currents, while a controller is responsive to the current detector. A plurality of reactive elements, like capacitors for example, are coupled to a plurality of switches such that the controller may selectively couple any of the plurality of reactive elements to the conductors by actuating a corresponding switch. When the current detector detects a current in excess of a predetermined threshold, the controller alters the complex impedance between the first and second sections by actuating one or more of the switches, thereby coupling one or more of the reactive elements to the conductors.

20 Claims, 4 Drawing Sheets

ELECTRICALLY ADAPTIVE MECHANICAL CONNECTION FOR ELECTRONIC DEVICES

BACKGROUND

1. Technical Field

This invention relates generally to electronic devices having multiple sections, with electronic components in each section, where power is transferred between the sections, and more specifically to a multiple section electronic device having an adaptive circuit for maximizing the efficiency of power transfer between the electrical components in each section.

2. Background Art

Electronic devices, like mobile telephones for instance, have advanced a long way in the past twenty years. Using the mobile telephone as an example, in only a short time, it has made the transformation from a large, bulky, heavy, expensive device to a device so slim, sleek, light and affordable that everyone can keep one in a shirt pocket.

Continuing the example, the mobile telephone of the late eighties was a device about the size of a shoe, with a large antenna coming out of the side. It had a battery pack the size of a fishing tackle box, and a bulky cord running between the battery pack and phone. Today, some mobile telephones are less than a quarter inch in thickness, weigh less than 5 ounces, and have internal antennae that are not even visible by the user. Modem mobile telephones even include sleek, aesthetic mechanical features as well. Some flip open like a clamshell, some swivel open like the hands of a clock, and others slide open. Indeed, phones with such mechanical features make the unopened smaller and easier to carry when not in use, yet make the phone more comfortable and more like a traditional phone when in use.

Such sophisticated mechanical opening and closing mechanisms, considered to be fashionable features by many, can create problems for the engineers and designers who make the mobile telephone. The mobile telephones of today are so small, that electrical components must be located in both sections of the phone. A display driver and radio frequency (RF) circuit may be in one section of the phone, while a microprocessor and voice encoder may be in the other section. Sophisticated electrical connections, including flexible conductors, are needed to transfer power back and forth between the sections. As the processors and RF circuits operate at high frequencies, this "electrical joint" can sometimes make the phone less efficient.

For example, when the microprocessor attempts to send high frequency messages to the RF circuitry, the electrical joint may inadvertently cause some of the energy to be dispersed. Where the phone has a metal surface, some of this power may get inadvertently coupled to the surface and become small surface or eddy currents. When the transferred energy becomes a surface current, it can't be used, for example, to transmit a call to a tower. The net result is decreased battery life and inconvenience for the user, as the user can't get as much talk time out of the phone.

One prior art solution to this problem is that of making a mobile telephone without a mechanical connection, and thus without an electrical joint. Some manufacturers do indeed offer these "candy bar" phones that do not flip, swivel or slide. The problem with this solution is that people enjoy the sophisticated mechanical features and thus are willing to even pay a premium to have them.

There is thus a need for an improved electronic device having a mechanical connection between sections that improves the efficiency of power transfer between the sections.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
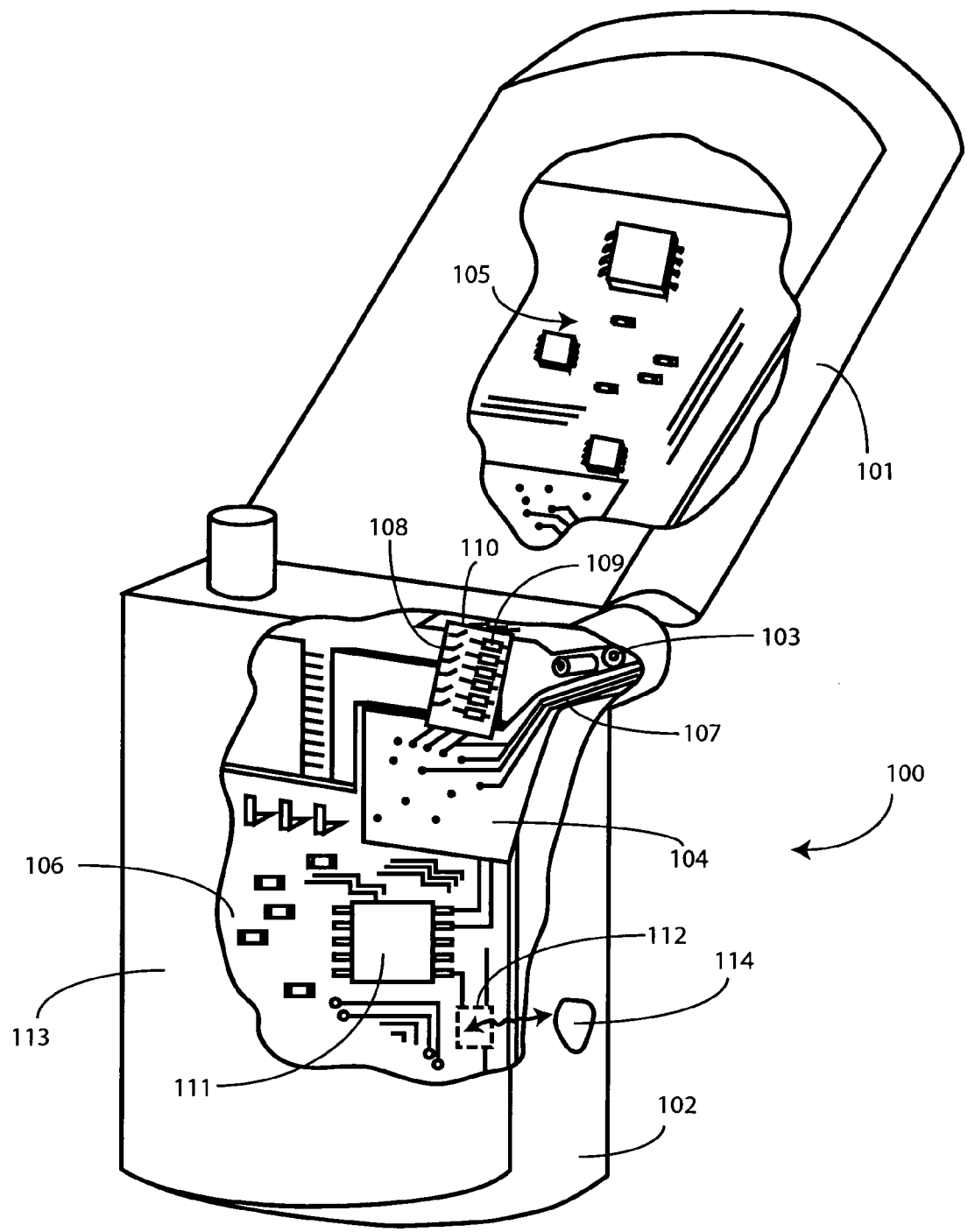
FIG. 1 illustrates one embodiment of an electronic device in accordance with the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to an electronic device having multiple sections, with an adaptive electrical circuit about a mechanical connection between the sections. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of adaptive electrical circuit about the mechanical connection of the electronic device described herein. The non-processor circuits may include, but are not limited to, a radio receiver, a radio transmitter, signal drivers, clock circuits, power source circuits, and user input devices. As such, these functions may be interpreted as steps of a method to perform efficient power transfer between the various sections of the electronic device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

A preferred embodiment of the invention is now described in detail. Referring to the drawings, like numbers indicate like parts throughout the views. In this document, relational terms such as first and second, top and bottom, and the like may be used solely to distinguish one entity or action from another entity or action without necessarily requiring or implying any actual such relationship or order between such entities or actions. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Described herein is an adaptive electrical circuit for optimizing the efficiency of power transfer from one section of an electronic device to a second section. In one embodiment, the adaptive electrical circuit works to alter the complex impedance at the mechanical connection. By controlling the impedance at the mechanical connection, surface currents that may appear may be moved and controlled so as to optimize the overall efficiency of the device without altering any far-field performance of RF-emitting devices, like mobile telephones. While it will be clear to those of ordinary skill in the art having the benefit of this disclosure that the invention is applicable to a wide variety of electronic devices, including mobile telephones, two-way radios, pagers, portable computers and personal digital assistants to name a few, the embodiment of a mobile telephone will be used herein as an exemplary embodiment.

Note that in the case of a mobile telephone, the phone may be capable of transmitting from multiple mechanical configurations. Where the phone is a clamshell type flip phone, the phone may transmit from a first configuration where the clamshell is flipped open. Such would be the case when a user has the phone open and is holding it against the ear. However, the phone may also be capable of transmitting while the clamshell is closed. Such would be the case where the user was using a headset, perhaps a wireless headset, and had the phone closed and in the pocket while transmitting. One advantage of the invention is that the adaptive electrical circuit may alter the impedance at the mechanical connection to optimize efficiency in both modes.

In one embodiment, a microprocessor in the mobile telephone alters the complex, electrical impedance between a first and second portion of the phone by switching in and out tuning elements. These tuning elements, which may be reactive components like capacitors and inductors, may be switched in and out so as to move and control various parasitic currents like surface currents that may appear upon metallic surfaces of the device.

For example, where the device includes a flexible substrate having conductors that transfer power back and forth between the sections of the device, a variable capacitance may be coupled to the conductors so as to change the complex impedance of the electronic joint. Where the conductors must traverse about the mechanical connection, like a hinge for example, the "loop" about the hinge includes a certain inherent self-inductance. By coupling a capacitor in parallel with the loop, a resonant, parallel, L-C circuit is formed that may be used to permit or prohibit currents at certain frequencies from passing from one section to the other.

In one embodiment, the electronic device is a mobile telephone having a flip-style clamshell mechanical configuration. The top and bottom halves of the device are coupled together by a hinge. A flexible substrate includes conductors that couple electronic components in the top half to electronic components in the bottom half. The conductors on the flexible substrate run about the hinge so as to form a loop. A plurality of capacitors, each coupled to a switch, are coupled across a gap in the substrate so as to be selectively couplable to the conductors. When coupled, by closing the switch connected to the selected capacitor, the capacitor and conductor form an effective parallel L-C circuit. A microprocessor is capable of selecting one or more of the capacitors by closing its respective switch. A current sensor, for example an inductive or Hall effect surface current sensor senses currents on the surface of the device. When they exceed a predetermined threshold, the sensor alerts the microprocessor. The microprocessor then switches in and out various capacitors so as to reduce or move the surface currents as desired.

Turning now to FIG. 1, illustrated therein is one embodiment of an electronic device 100 in accordance with the invention. Continuing with the exemplary embodiment from above, the electronic device 100 of FIG. 1 is a clamshell style mobile telephone, or radiotelephone. The device 100 includes a top section 101 and a bottom section 102, with a hinge 103 mechanically coupling the top section 101 to the bottom section 102. A flexible substrate 104 is provided to couple an electrical circuit disposed in the top section 105 to an electrical circuit disposed in the bottom section 106.

The flexible substrate 104 includes at least one conductor 107 that passes about the hinge 103. The conductor 107, or conductors as the case may be, effectively form a "middle node" within the device 100. The term middle node is used because the conductor(s) 107 are the electrical coupling between the circuit disposed in the top section 105 and the circuit disposed in the bottom section 106. Currents moving from circuit to circuit pass through the middle node.

In one embodiment, due to the circumferential path that the conductor(s) 107 take about the hinge, the conductor 107 forms a loop. The loop has an inherent self-inductance, which is used by the invention to alter the complex impedance between the electrical circuit disposed in the top section 105 and the electrical circuit disposed in the bottom section 106.

A selectively variable frequency dependent circuit 108 is selectively connectable to the conductor(s) 107 forming the middle node. In one embodiment, the selectively variable frequency dependent circuit 108 comprises a plurality of capacitors 109 coupled to a plurality of switches 110 on a one to one basis. In other words, each capacitor is coupled to a switch, such that that particular capacitor may be selectively coupled to the middle node when its corresponding switch is closed.

A current detector 112 is disposed within at least one of the top section 101 and the bottom section 102. In the embodiment of FIG. 1, the current detector 112 is located in the bottom section 102, although it could equally be placed in the top section 101 or both. The current detector 112 is capable of sensing undesirable currents, like surface currents flowing on the exterior 113 of the device 100 for example. In one embodiment, the current detector 112 is an inductive device capable of contactlessly sensing these currents. Other devices, like Hall effect sensors, may also be used.

A controller 111 is coupled to the current detector 112. When the controller 111 detects, from the current detector 112, a current in excess of a predetermined threshold, the controller 111 selectively couples any of the plurality of capacitors 109 to the conductor(s) 107 forming the middle node. Stated differently, when the current detector 112 determines that an undesired current exceeds a predetermined threshold, the current detector 112 relays this information to the controller 111. The controller 111 is then able to close one or more of the plurality of switches 110, thereby coupling one or more of the plurality of capacitors 109 to the conductor(s) 107 forming the middle node so as to form a resonant L-C circuit between the top section 101 and the bottom section 102. When any of the plurality of capacitors 109 are connected to the conductor(s) 107 by the controller 111, the complex (i.e. frequency dependent) impedance between the electrical circuit disposed in the top section 105 and the electrical circuit disposed in the bottom section 106 changes.

In one embodiment, at least one surface 114 of on the bottom section 102, top section 101 or both, is a least partially covered with a conductive material. For example, the conductive material may be a metal exterior, or it may be metalized plastic or conductive ink. Where this is the case, the current detector 112 may sense surface currents on the surface 114 at least partially covered with conductive material. When the surface current exceeds a predetermined threshold, the current detector 112 alerts the processor 111, which is then able to selectively couple one or more of the plurality of capacitors 109 to the conductors 107 forming the middle node, so as to alter the impedance between the circuit disposed in the top section 105 and the circuit disposed in the bottom section 106.

Once the controller 111 actuates one of the plurality of switches 110, thereby coupling at least one of the plurality of capacitors 109 to the middle node, the current detector 112 then senses whether the sensed current has increased or decreased. When the current detector 112 detects a change by at least a predetermined amount in the sensed current, the controller 111 then either actuates a second of the plurality of switches 110, or deactuates the actuated switch as the application warrants.

By way of example, where the controller 111 actuates a first switch, thereby coupling a capacitor to the middle node, if the current detector 112 detects a decrease in current by a predetermined amount, and decreased current is desirable, the controller 111 may actuate a second switch. The actuation of the second switch will place a second capacitor in parallel with the first, thereby again altering the complex impedance between the sections 101,102. Should the current decrease again, the controller 111 may elect to actuate a third switch, and so forth.

Conversely, should the current at interest increase, again presuming that a decrease is desirable, the controller 111 may deactuate the switch so as to decouple the capacitor from the middle node. Alternatively, where the current decreases and an increase in current is desirable, the controller 111 may likewise deactuate the switch.

Figure 2:
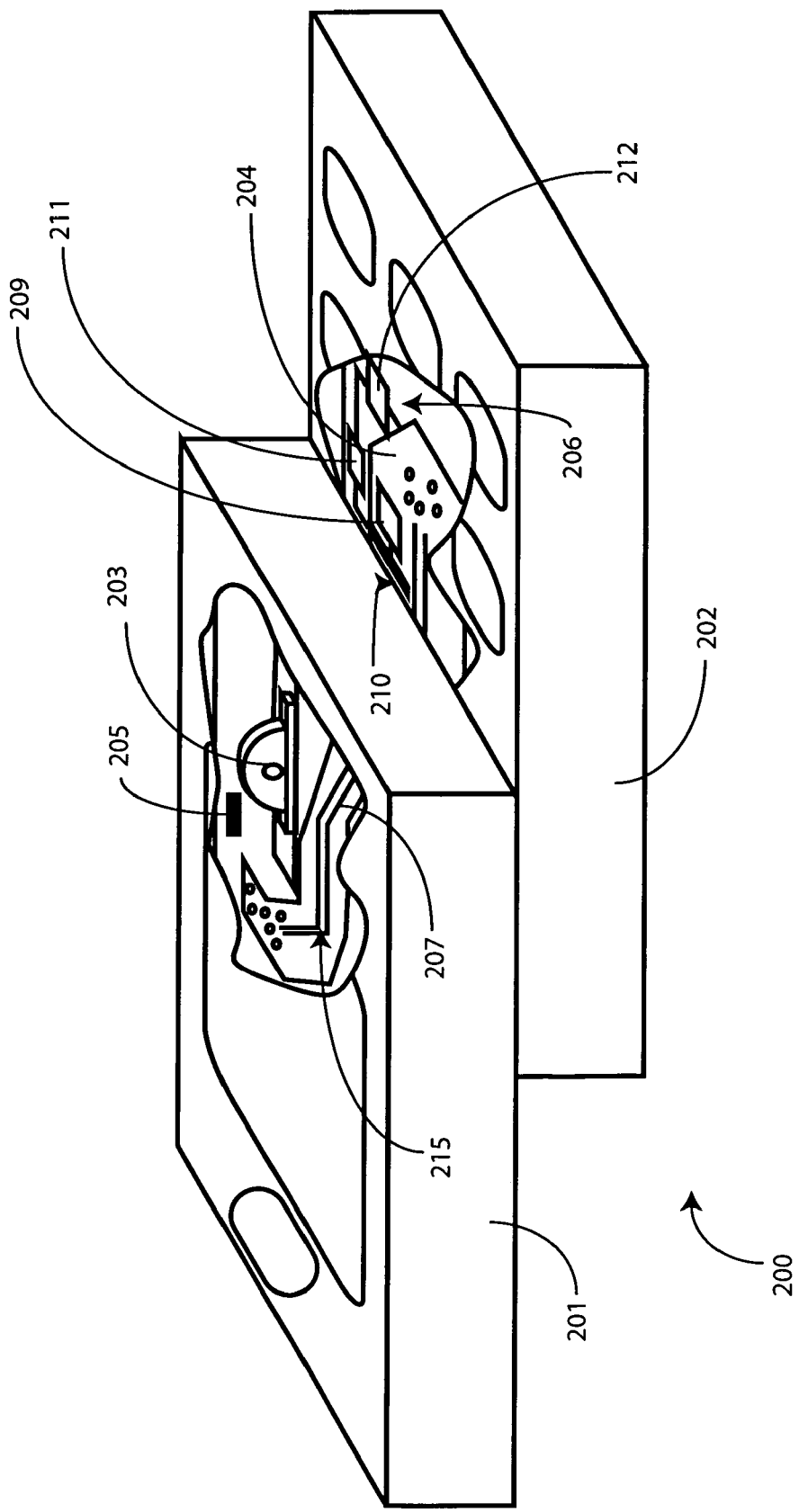
FIG. 2 illustrates another embodiment of an electronic device in accordance with the invention.

Turning now to FIG. 2, illustrated therein is an electronic device 200 in accordance with the invention. Again, it will be clear to those of ordinary skill in the art having the benefit of this disclosure that the impedance adjusting circuit of this invention could be implemented in any of a number of electronic devices having a first section, second section and electrical conductors coupling circuitry disposed in the sections. Mobile telephones are used herein as illustrative examples only. Additionally, as noted above, the invention may be employed with electronic devices having varying form factors. The electronic device of FIG. 1 was a clamshell device, while the electronic device of FIG. 2 is a sliding device. However the discussion of the figures should not be interpreted as limited to the particular embodiment of that figure. For example, elements in the sliding electronic device could be equally applied to the clamshell, and vice versa.

The electronic device 200 of FIG. 2 includes a first portion 201 and a second portion 202, wherein a connector 203 at a connection joins the first portion 201 and second portion 202. As the first portion 201 and second portion 202 slide relative to each other, the connector 203 may comprise a geared wheel and toothed track, so as to work as a rack and pinion system. Other equivalent, sliding mechanical connection systems may be substituted for the connector 203 illustrated.

The device 200 includes a circuit 204 having a middle node 207 disposed in close proximity with the mechanical connector 203. The circuit 204 electrically couples components disposed within the first portion 205 with components disposed in the second portion 207. As with FIG. 1, a selectively variable frequency dependent circuit 210 is included. The selectively variable frequency dependent circuit 210 is selectively connectable to the middle node 207.

A surface current detection circuit 212 is capable of detecting currents along an outer surface of the device 200. The surface current detection circuit 212 may take many forms, as is known in the art. For example, the surface current detection circuit 212 may be a voltage sensor that senses voltages present across sections of the surface of the device 200 having inherent self-impedances. Alternatively, the surface current detection circuit 212 may be an inductive component that inductively senses currents on the surface of the device 200. Other devices, including reed switches, Hall effect sensors and electromagnetic components may also be substituted.

A controller 211 is coupled to the surface current detection circuit 212. When the surface current detection circuit 212 determines that a surface current exceeds a predetermined threshold, the controller 211 connects the selectively variable frequency dependent circuit 210 to the middle node 207.

In one embodiment, when the controller 211 connects the selectively variable frequency dependent circuit 210 to the middle node 207, the surface current detection circuit 212 senses surface current to determine whether there has been an increase or decrease in the amount of surface current. Where the surface current detection circuit 212 detects a decrease in the surface current, the controller 211 selectively decreases a complex impedance of the selectively variable frequency dependent circuit 210. Alternatively, when the controller 211 connects the selectively variable frequency dependent circuit 210 to the middle node 207, and where the surface current detection circuit 212 detects an increase in the surface current, the controller 211 may selectively increase the complex impedance of the selectively variable frequency dependent circuit 210.

Figure 3:
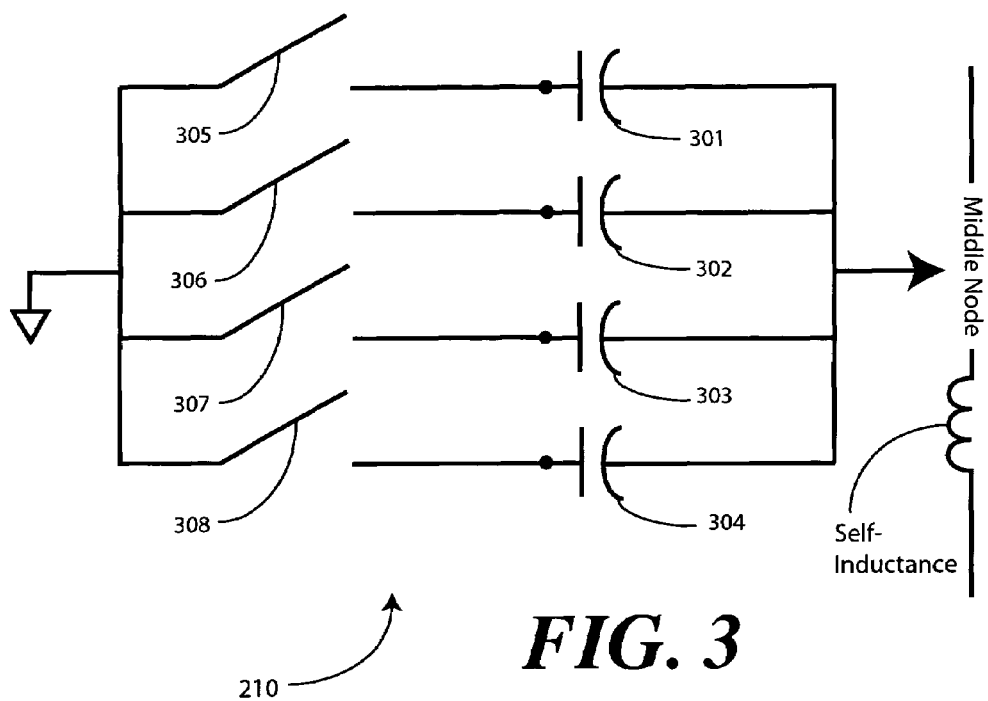
FIGS. 3 and 4 show illustrative embodiments of selectively variable frequency dependent circuits in accordance with the invention.
Figure 4:
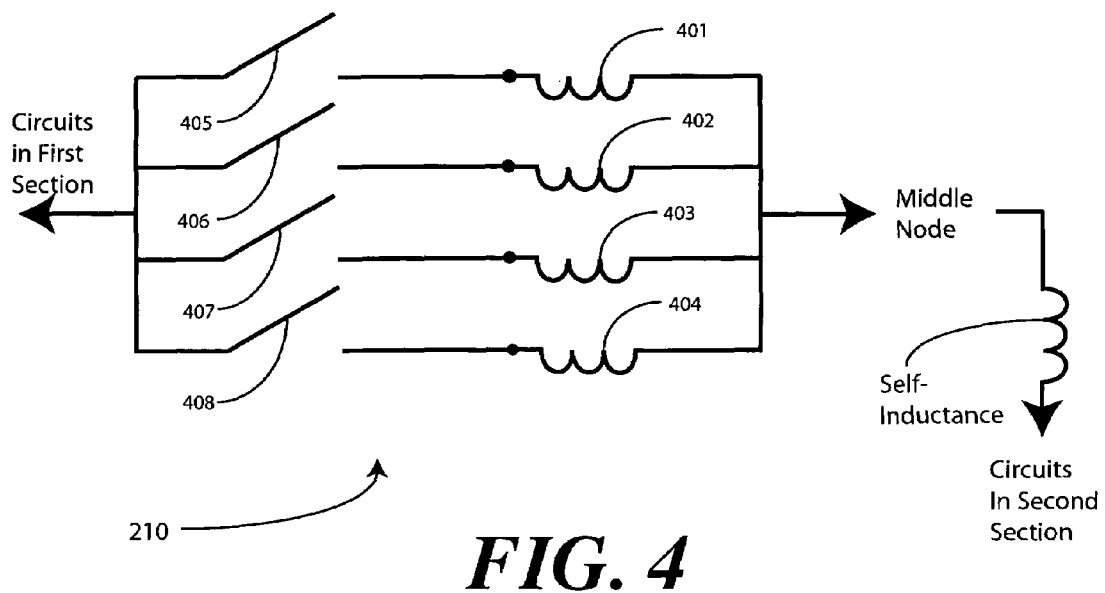

Turning now to FIGS. 3 and 4, illustrated therein are two exemplary embodiments of selectively variable frequency dependent circuits 210. In the embodiment of FIG. 3, the selectively variable frequency dependent circuit 210 includes a plurality of capacitors 301-304 and a plurality of switches 305-308, wherein each of the plurality of capacitors 301-304 is coupled to a corresponding one of the plurality of switches 305-308 in a capacitor-switch arrangement. In other words, a first capacitor 301 is coupled to a first switch 305, a second capacitor 302 is coupled to a second switch 306, and so forth. In at least one embodiment the switch selectively couples the capacitor to a reference voltage, such as a ground for at least one of the top section and the bottom section, which will generally be at approximately the same potential.

In this capacitor-switch arrangement, the controller (211 of FIG. 2) may couple any of the plurality of capacitors 301-304 to the middle node (207 of FIG. 2) by actuating the corresponding switch in the capacitor switch arrangement. For example, to couple capacitor 301 to the middle node (207 of FIG. 2), the controller (211 of FIG. 2) would close switch 305. Where more than one switch is closed, the corresponding capacitors are coupled in parallel, thereby increasing the capacitance. As noted in the discussion of FIG. 1, the middle node (207 of FIG. 2) has a certain self-inductance inherent in the conductors. As such, when the controller (211 of FIG. 2) couples the capacitors to the middle node (207 of FIG. 2), a resonant L-C circuit is created. As such, the controller (211 of FIG. 2) may increase or decrease the complex impedance at the middle node (207 of FIG. 2) by opening or closing the switches 305-308 as desired.

Turning now to FIG. 4, the selectively variable frequency dependent circuit 210 may also include inductive components 401-404 coupled to respective switches 405-408. Depending upon the application the designer may desire that the controller (211 of FIG. 2) alter the complex impedance of the middle node by switching in serial inductors. Where this is the case, an inductor-switch arrangement, as illustrated in FIG. 4, may be employed.

While reactive elements have been shown, it may be effective to selectively switch in one or more resistors, and/or various combinations of capacitors, inductors and resistors. One skilled in the art will readily appreciate that still further approaches may be employed for selectively adjusting the impedance at the middle node without departing from the teachings of the present invention.

Turning back to FIG. 2, as with FIG. 1, in one embodiment, the conductors forming the middle node 207 on the circuit 204 form a conductor loop 215. In this such an embodiment, the plurality of capacitors 209 are disposed such that when any switch in a selected capacitor switch arrangement is actuated, the corresponding capacitor in the selected capacitor switch arrangement is connected to the middle node 207 in parallel with the conductor loop. As such, and as described above, a resonant L-C circuit is created. By changing the number of capacitors coupled to the middle node 207, the complex impedance between the first and second sections 201,202 may be altered. Stated differently, when the controller 211 actuates a switch in a selected capacitor switch arrangement, a change occurs in the complex impedance between the components disposed within the first portion 205 and the components disposed within the second portion 206. In one embodiment, the circuit elements making the middle node 207 are electrical conductors disposed upon a conductive substrate.

Figure 5:
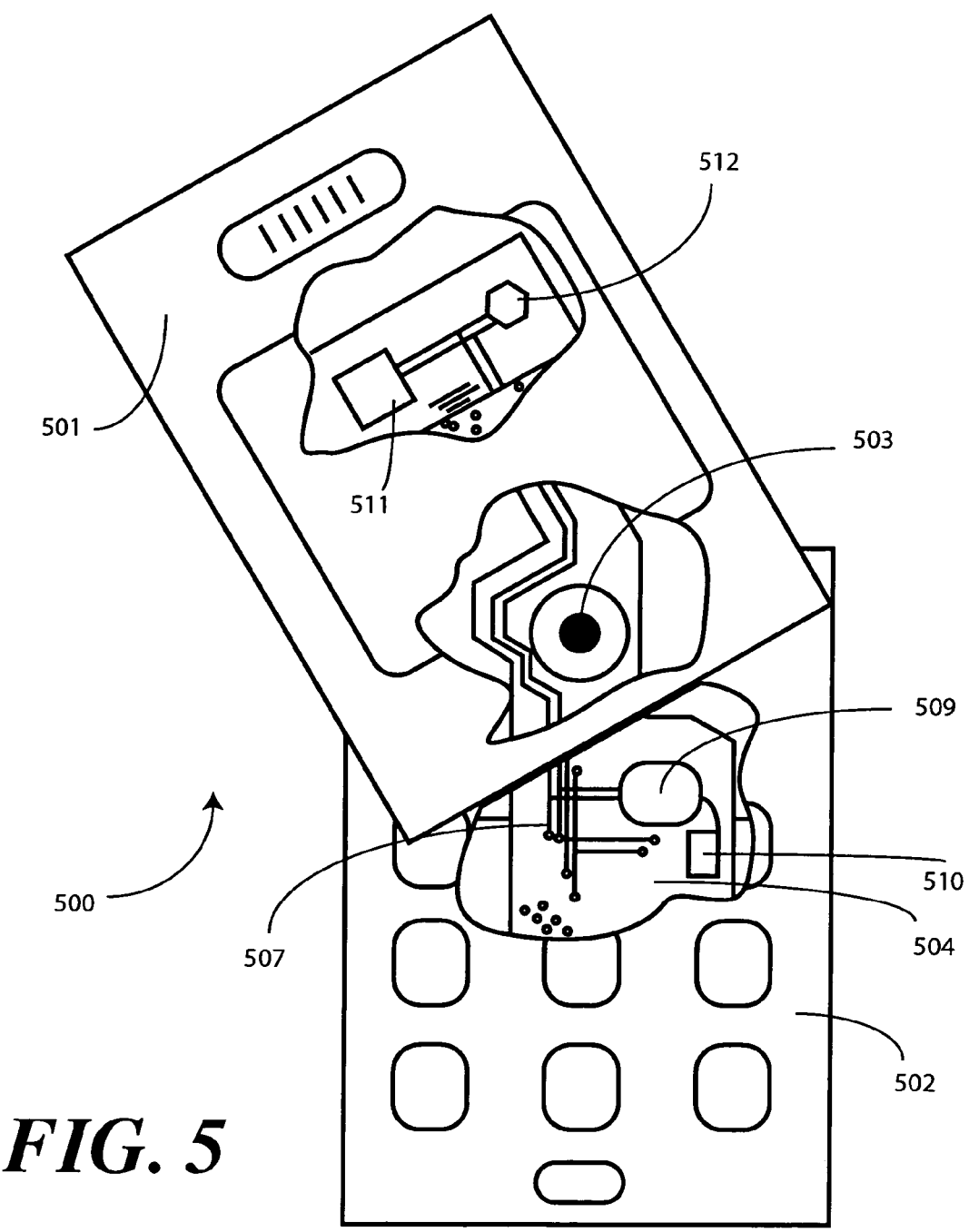
FIG. 5 illustrates another embodiment of an electronic device in accordance with the invention.

Turning now to FIG. 5, illustrated therein is yet another embodiment of an electronic device 500 in accordance with the invention. The device 500 of FIG. 5 is a radiotelephone having a first section 501 and a second section 502, wherein the first section 501 and second section 502 are joined by a separating mechanism 503. In this illustrative embodiment, the separating mechanism 503 is a swivel, thereby allowing the top section 501 of the device 500 to swivel from a first mechanical configuration having the first section 501 and second section 502 aligned in a first orientation (e.g. the first section 501 rotated such that it is on top of the second section 502), to a second mechanical configuration having the first section 501 and the second section 502 aligned in a second orientation (e.g. as shown).

As with FIGS. 1 and 2, the embodiment of FIG. 5 includes an electrical circuit 504 having conductors 507 capable of transferring current between the first section 501 and the second section 502. The conductors 507, in one embodiment, pass about the separating mechanism 503.

A plurality of complex impedance elements 509 (shown as a block for simplicity in FIG. 5—FIGS. 3 and 4 illustrated suitable schematic level diagrams) is coupled to the conductors 507. A plurality of switches 510 is coupled to the plurality of complex impedance elements 509.

A current sensor 512 capable of detecting surface currents on a surface of either the first section 501 or the second section 502 is included. Additionally, a controller 511, which is responsive to the current sensor 512, and which is capable of actuating any of the plurality of switches, is also included.

When the current sensor 512 detects a surface current in excess of a predetermined threshold, the controller 511 actuates at least a first of the plurality of switches 510. Where the controller actuates one of the plurality of switches 510, and the current sensor 512 detects a change by at least a predetermined amount in the surface current, the controller may either actuate a second of the plurality of switches 510 or deactuate the first of the plurality of switches 510.

As noted in the discussion of FIGS. 3 and 4, the plurality of complex elements 509 may be reactive elements of either capacitors or inductors. The plurality of switches 510 are coupled to a corresponding one of the plurality of reactive elements 509, be they capacitors or inductors, in a reactive element-switch arrangement, such that when any of the plurality of switches are actuated, the plurality of reactive elements are electrically coupled in parallel with a loop formed by the conductors 507.

As discussed above, any of the illustrated embodiments, from the clamshell to flip to slider, are selectively configurable between a first mechanical configuration having the first section and the second section aligned in a first orientation, and a second mechanical configuration having the first section and the second section aligned in a second orientation. As the electronic device may be operable in either configuration, and as the complex impedance between the sections changes depending upon the orientation, the invention allows the device to continually manipulate the complex impedance at the electronic joint to achieve optimal performance. As the environment also affects the complex impedance—for example the complex impedance will be different if the device is open and in the hand when compared to closed and on a table—the invention provides a self-configuring mechanism to optimize efficiency.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims.

Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. An electronic device, comprising:
   a. at least a first portion and a second portion, wherein the first portion and the second portion are joined by a mechanical connector at a connection;
   b. a circuit having a middle node disposed in close proximity with the mechanical connector, the circuit electrically coupling components disposed within the first portion to components disposed within the second portion;
   c. a selectively variable frequency dependent circuit that is selectively connectable to the middle node;

d. a surface current detection circuit; and e. a controller, wherein when the surface current detection circuit determines that a surface current exceeds a predetermined threshold, the controller connects the selectively variable frequency dependent circuit to the middle node.

2. The device of claim 1, wherein when the controller connects the selectively variable frequency dependent circuit to the middle node, and the surface current detection circuit detects a decrease in the surface current, the controller selectively decreases a complex impedance of the selectively variable frequency dependent circuit.

3. The device of claim 2, wherein the selectively variable frequency dependent circuit comprises a plurality of capacitors and a plurality of switches, wherein each of the plurality of capacitors is coupled to a corresponding one of the plurality of switches in a capacitor-switch arrangement, such that the controller may couple any of the plurality of capacitors to the middle node by actuating a switch in a selected capacitor-switch arrangement.

4. The device of claim 3, wherein the circuit comprises at least one conductor loop coupled to the middle node, further wherein the plurality of capacitors are disposed along the circuit such that when any switch in a selected capacitor-switch arrangement is actuated, a corresponding capacitor in the selected capacitor-switch arrangement is connected to the middle node in parallel with the at least one conductor loop.

5. The device of claim 4, wherein the circuit is disposed upon a conductive substrate, wherein the middle node comprises an electrical conductor disposed upon the conductive substrate.

6. The device of claim 3, wherein when the controller actuates the switch in the selected capacitor-switch arrangement, a change occurs in a complex impedance between the components disposed within the first portion and the components disposed within second portion.

7. The device of claim 1, wherein when the controller connects the selectively variable frequency dependent circuit to the middle node, and the surface current detection circuit detects an increase in the surface current, the controller selectively increases a complex impedance of the selectively variable frequency dependent circuit.

8. A radiotelephone, comprising:
a. a first section and a second section, wherein the first section and the second section are joined by a separating mechanism;
b. an electrical circuit having conductors, which transfer current between the first section and the second section, the conductors passing about the separating mechanism;
c. a plurality of complex impedance elements coupled to the conductors;
d. a plurality of switches coupled to the plurality of complex impedance elements;
e. a current sensor capable of detecting surface currents on at least one of the first section and the second section; and
f. a controller, responsive to the current sensor, capable of actuating any of the plurality of switches.

9. The radiotelephone of claim 8, wherein when the current sensor detects a surface current in excess of a predetermined threshold, the controller actuates at least a first of the plurality of switches.

10. The radiotelephone of claim 9, wherein when the controller actuates the at least a first of the plurality of switches, and the current sensor detects a change by at least a predetermined amount in the surface current, the controller executes an operation selected from the group consisting of actuating at least a second of the plurality of switches and deactuating the at least a first of the plurality of switches.

11. The radiotelephone of claim 9, wherein when the controller actuates the at least one of the plurality of switches, and the current sensor capable of detecting surface currents detects an decrease in the surface current, the controller actuates at least a second of the plurality of switches.

12. The radiotelephone of claim 11, wherein the separating mechanism is selected from the group consisting of sliding connections, rotating connections and hinged connections.

13. The radiotelephone of claim 11, wherein the separating mechanism comprises a hinge, further wherein the radiotelephone is selectively configurable between at least a first mechanical configuration having the first section and the second section aligned in a first orientation, and a second mechanical configuration having the first section and the second section aligned in a second orientation.

14. The radiotelephone of claim 13, wherein the conductors are disposed upon a conductive circuit substrate, such that the conductors form at least one loop.

15. The radiotelephone of claim 14, wherein the at least one loop is disposed about the hinge.

16. The radiotelephone of claim 15, wherein the plurality complex impedance elements comprise a plurality of reactive elements selected from the group consisting of capacitors, inductors and combinations thereof, and a plurality of switches, wherein each of the plurality of reactive elements is coupled to a corresponding one of the plurality of switches in a reactive element-switch arrangement, such that when the any of the plurality of switches are actuated, the plurality of reactive elements are electrically coupled in parallel with the loop.

17. A clam-shell style radiotelephone, comprising:
a. a top section and a bottom section;
b. a hinge mechanically coupling the top section to the bottom section;
c. a flexible substrate electrically coupling an electrical circuit disposed in the top section with an electrical circuit disposed in the bottom section, wherein the flexible substrate includes at least one conductor passing about the hinge;
d. a plurality of capacitors that are selectively connectable to the at least one conductor;
e. a current detector disposed within at least one of the top section and the bottom section; and
f. a controller coupled to the current detector;
wherein when the current detector detects a current in excess of a predetermined threshold, the controller selectively couples any of the plurality of capacitors to the at least one conductor.

18. The radiotelephone of claim 17, wherein the at least one conductor passing about the hinge comprises a loop, further wherein when any of the plurality of capacitors are connected to the at least one conductor by the controller, a complex impedance between the electrical circuit disposed in the top section and the electrical circuit disposed in the bottom section changes.

19. The radiotelephone of claim 18, wherein at least one of the top section and the bottom section includes a surface at least partially covered with a conductive material, wherein the current detector inductively senses surface currents on the surface at least partially covered with a conductive material.

20. The radiotelephone of claim 19, wherein the clam-shell style radiotelephone is selectively configurable between at least a first configuration having the top section and the bottom section aligned in a first orientation, and a second configuration having the top section and the bottom section aligned in a second orientation.

* * * * *